IRRADIATION OF MONOCLINIC GLYCINE SULPHATE

Filed May 14, 1958

INVENTOR
A. G. CHYNOWETH
BY Lucian C. Canepa
ATTORNEY

United States Patent Office 3,005,096
Patented Oct. 17, 1961

3,005,096

IRRADIATION OF MONOCLINIC GLYCINE SULPHATE

Alan G. Chynoweth, Summit, N.J., assignor to Bell Telephone Laboratories, Incorporated, New York, N.Y., a corporation of New York Filed May 14, 1958, Ser. No. 735,270
6 Claims. (Cl. 250—42)

This invention relates to monoclinic glycine sulphate, and more particularly to the irradiation thereof.

In application Serial No. 619,463, filed October 31, 1956, by B. T. Matthias, there is disclosed the fact that monoclinic glycine sulphate is a ferroelectric.

Ferroelectrics exhibit certain remarkable dielectric properties which are in many ways analogous to the magnetic properties of ferromagnetics. For example, just as ferromagnetics exhibit a hysteresis effect in the relationship of magnetic induction and magnetic field, ferroelectrics display a hysteresis loop characteristic in the relationship of polarization and applied electric field.

Ferroelectrics have been utilized as charge storing elements in numerous computer and switching arrangements. One such arrangement is disclosed in application Serial No. 627,381, filed on December 10, 1956, by J. R. Anderson and R. M. Wolfe, now Patent No. 2,839,739, which arrangement is a shift register including internally biased ferroelectric capacitors. (Normal ferroelectrics exhibit hysteresis loops arranged substantially symmetrically about the point of zero applied voltage. By contrast, certain ferroelectrics, guanidinium aluminum sulphate hexahydrate, for example, have the property of an internal bias, exhibited by a shift of the hysteresis loop along the voltage axis. This property is described in an article entitled "Properties of Guanidinium Aluminum Sulphate Hexahydrate and Some of Its Isomorphs," by A. N. Holden, W. J. Merz, J. P. Remeika, and B. T. Matthias, appearing in the Physical Review, vol. 101, No. 3, at page 962.)

An object of the present invention is a ferroelectric whose hysteresis characteristic may be selectively varied.

Another object of this invention is a ferroelectric to whose hysteresis loop there may be imparted a preselected bias.

More specifically, an object of the present invention is the preselection of the hysteresis characteristics of monoclinic glycine sulphate involving, in particular, the shifting of its hysteresis loop in either a positive or a negative direction along the voltage axis, or the splitting of its loop, and the biasing of the split portions, in a desired and reproducible manner.

These and other objects of the present invention are attained by bombarding crystals of monoclinic glycine sulphate with ionizing radiation including, for example, X-rays, electrons, and gamma rays.

Thus, a feature of this invention is an irradiated crystal of monoclinic glycine sulphate, characterized by a single (or split) hysteresis loop having a preselected bias.

This and other features and advantages of the present invention will be fully apprehended from the following detailed description thereof taken in connection with the appended drawings, in which.

Figure 3A:
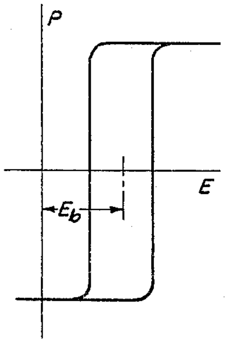
Figure 3B:
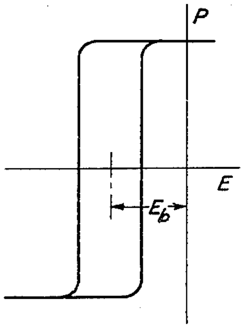
Figure 4:
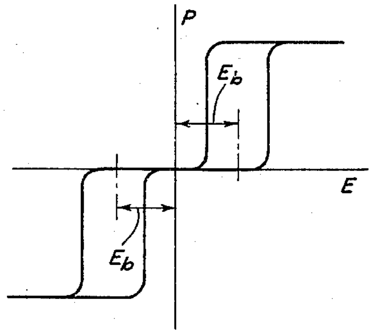
Figure 5:
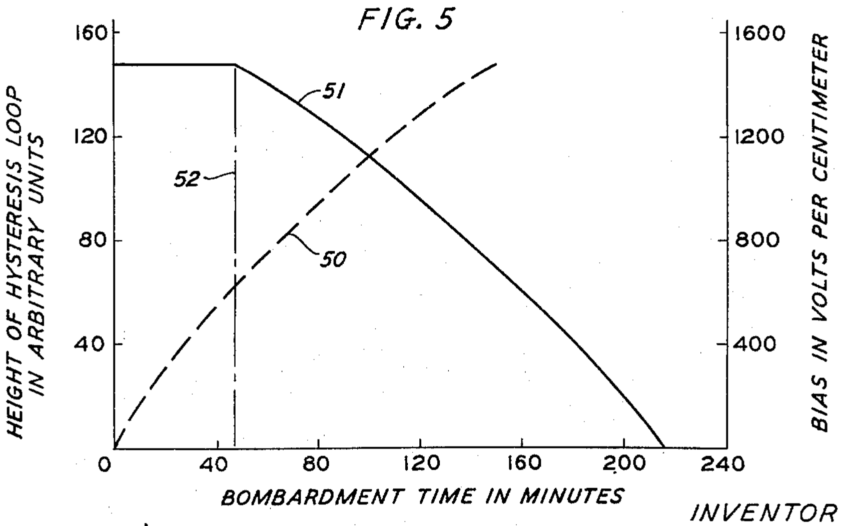
Figure 6:
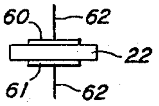

FIGS. 3*a* and 3*b* are the hysteresis loops, after bombardment, of crystals of monoclinic glycine sulphate which were fully polarized before bombardment;

FIG. 4 is the hysteresis characteristic, after bombardment, of a crystal of monoclinic glycine sulphate which was neutrally polarized before bombardment;

FIG. 5 is a graph illustrating the variation of both the height and bias of the hysteresis loop of a crystal of monoclinic glycine sulphate as a function of time of bombardment thereof; and FIG. 6 shows a wafer of monoclinic glycine sulphate, having electrodes respectively secured to the main faces thereof.

Figure 1:
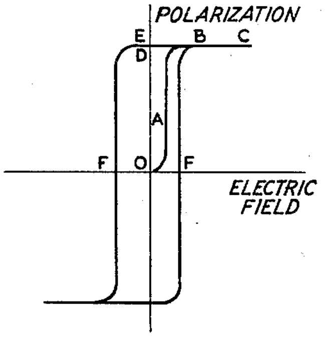
FIG. 1 is the hysteresis loop of a normal (i.e., unbombarded) crystal of monoclinic glycine sulphate to which has been applied an electric field sufficiently large to polarize the crystal to saturation.

A ferroelectric hysteresis loop for an unbombarded crystal of monoclinic glycine sulphate is shown schematically in FIG. 1. Its cause is understandable on the basis of a concept which considers the ferroelectric to consist of a number of regions called ferroelectric domains. Consider a crystal of monoclinic glycine sulphate initially consisting of equal amounts of positive and negative domains (i.e., the domains are antiparallel with respect to some given crystallographic direction, this condition being commonly referred to as a neutrally polarized one). Upon increasing the field in the positive direction, the positive domains grow at the expense of the negative domains. The polarization increases very rapidly (FIG. 1, OA) and reaches a saturation region BC, in which region all domains are aligned in the direction of the field.

When the field is reduced to zero again, the domain configuration remains aligned, and at zero field a finite value of the polarization can be measured, called the remanent polarization $P_r$(OD). (Extrapolation of the linear portion BC of the hysteresis loop back to the polarization axis yields the value of the spontaneous polarization $P_s$(OE). For an essentially rectangular loop the values of the remanent and spontaneous polarizations are approximately equal.) In order to annihilate the remanent polarization there must be applied to the crystal an electric field in the opposite or negative direction. The field needed for this purpose is called the coercive field $E_c$(OF). Upon further increase of the field in the negative direction, uniform alignment of the domains can again be achieved, but in a direction opposite to the previous one.

The ferroelectric hysteresis loop can be directly observed on a cathode ray oscilloscope by means of a circuit first described by C. B. Sawyer and C. H. Tower in an artcle entitled "Rochelle Salt as a Dielectric," which appeared in the Physical Review, vol. 35, at pages 269–273. The value of the spontaneous polarization can be determined by measuring the distance OE of the observed loop on a calibrated cathode ray screen. It is also possible to determine the temperature dependence of the spontaneous polarization by observing the change of the distance OE as a function of the temperature of the crystal. In typical ferroelectrics the spontaneous polarization diminshes as the crystal is heated, and it disappears at a temperature which is called the ferroelectric Curie point, which for monoclinic glycine sulphate is 47.5° C. (Unless otherwise clearly indicated, the procedures described herein were carried out at temperatures below the Curie point of monoclinic gylcine sulphate.)

Figure 2:
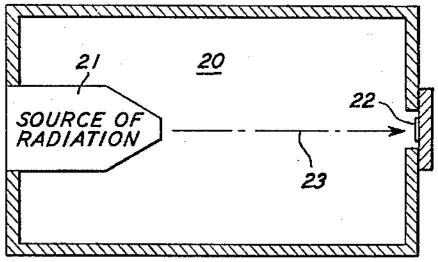
FIG. 2 is a schematic representation of a radiation chamber in which, in accordance with the principles of the present invention, crystals of monoclinic glycine sulphate may be bombarded.

In FIG. 2 there is schematically depicted a radiation chamber 20 including a source of radiation 21. The source 21 may be arranged to provide any type of ionizing radiation, such as, for example, X-rays, electrons, or gamma rays.

A disc 22, formed from a single crystal of monoclinic glycine sulphate, is shown mounted in the chamber 20 in alignment with the radiation (whose direction is indicated by an arrow 23) emitted by the source 21.

The disc 22 was fabricated in the following manner: A single crystal of monoclinic glycine sulphate was grown by the procedures described in the above identified application of Matthias and then cleaved into thin slices and ground down to the desired thickness, illustratively about 0.013 millimeter. The slices were cut into discs about 3 millimeters square, and gold electrodes 2 millimeters in diameter were evaporated opposite each other on the major faces of each disc. Leads of narrow strips of aluminum foil were then affixed to the gold electrodes by minute spots of air-drying silver paste.

In FIG. 6 there is shown a disc 22 of monoclinic glycine sulphate having two electrodes 60 and 61 respectively affixed to the major faces thereof, and including a lead 62 secured to each electrode.

Referring now to FIG. 3*a*, there is shown the positively biased hysteresis loop of a bombarded disc of monoclinic glycine sulphate, which disc was polarized to saturation before bombardment by the application thereto of a negative field; illustratively, by a negative field two or three times greater than the coercive field, and applied for 100 microseconds or more.

Similarly, in FIG. 3*b* there is shown the negatively biased hysteresis loop of a bombarded disc of monoclinic glycine sulphate, which disc was polarized to saturation before bombardment by the application thereto of a positive field. Thus, it is seen that the polarity of the imparted bias is dependent upon the direction of the field employed in initially polarizing the ferroelectric.

Bombardment, in accordance with the principles of the present invention, of a sample of monoclinic glycine sulphate which is neutrally polarized before bombardment results in a hysteresis characteristic of the form shown in FIG. 4. The striking feature of this characteristic is that it comprises two separate and nearly rectangular loops which are biased by equal and opposite amounts along the applied field axis. Also, the sum of the heights of the two loops are equal to the height of the loop of an unbombared sample.

The particular characteristic shown in FIG. 4 includes two identical loops and resulted from the bombardment of an initially neutrally polarized crystal of monoclinic glycine sulphate. For crystals initially polarized to some extent, but to less than saturation, there were observed characteristics of the type shown in FIG. 4, but wherein the two loops thereof were of unequal heights. And the heights of the two loops were in the ratio of the amounts of the oppositely polarized domains.

It is to be noted that the term "bias" as employed herein refers to the value of the applied field corresponding to the center of the hysteresis loop and is indicated in each of FIGS. 3*a*, 3*b*, and 4 by the symbol $E_b$.

Biasing of the hysteresis loop of monoclinic glycine sulphate may, in theory, be effected by radiation which imparts to the unit cells of the ferroelectric energy of the order of 10 electron volts. Radiation of this energy does not, however, penetrate the material to a useful depth (i.e., the thickness of the material). In practice, it has been found that uniform biasing effects may be attained in crystals 0.013 millimeter thick with an X-ray spectrum extending to energies greater than $10^4$ electron volts (10 kev.), or with electrons having energies greater than $2 \times 10^5$ electron volts (200 kev.).

The relationships between the time of irradiation of an 0.013 millimeter thick sample of monoclinic glycine sulphate with an X-ray spectrum having a peak energy of 30 kev. and both the imparted bias (curve 50) and height (curve 51) of the hysteresis loop thereof are shown in FIG. 5. (Although the samples described herein were polarized and irradiated along generally the same crystallographic axis, it is noted that this is not a necessary condition for the successful practice of the principles of the present invention.)

FIG. 5 indicates that after a region of relative constancy the height of the loop decreases rather sharply with increase in time of bombardment. This decrease would, for many applications, not be advantageous, and so, as a practical matter, only bombardment times to the left of the dashed line 52 of FIG. 5 would be selected. The over-all height and rectangularity of the loop is preserved in this preferred region, and the relationship therein between bombardment time and imparted bias is almist a linear one. (It is noted that the coercive field also varies with bombardment time, and for an 0.013 millimeter thick disc of monoclinic glycine sulphate irradiated with 30 kev. X-rays might, for example, in the preferred region, vary between limits of about 130 and 180 volts per centimeter.)

Two other biasing effects resulting from the irradiation of monoclinic glycine sulphate deserve attention herein. One of these involves the application to the ferroelectric during the bombardment period of an alternating electric field having an amplitude greater than the coercive field. It is then observed during the bombardment that the hysteresis loop remains normal. However, removal of the field for several minutes after the bombardment period allows the ferroelectric to relax to a split loop pattern.

The second effect resulted from bombarding a sample of monoclinic glycine sulphate at a temperature higher than its Curie point. No electric field was applied during this bombardment. At the end of a bombardment period sufficiently long ordinarily to make the biasing effects apparent the crystal was cooled to room temperature (below 47.5° C.). Its hysteresis characteristic then appeared normal. Again, however, there was observed a time effect: If the field was removed for several minutes from the ferroelectric, and then re-applied, a split hysteresis loop was observed.

In summary, the principles of the present invention make possible the selective variation of the hysteresis characteristics of samples of monoclinic glycine sulphate in a simple and readily reproducible manner. These samples are well suited for incorporation in shift register circuits of the type described in the above identified Anderson-Wolfe application. Alternatively, the samples may advantageously be employed as radiation monitors, the samples acting as integrators for radiation flux, which integrators can be interrogated nondestructively, for example, by pulse techniques.

It is to be understood that the above described arrangements are illustrative and not restrictive of the principles of this invention. Other arrangements may be devised by those skilled in the art in view of the teachings set out above without departing from the spirit and scope of the invention.

What is claimed is:

1. A method of selectively varying the hysteresis characteristic of a single crystal of monoclinic glycine sulphate comprising the steps of electrically polarizing the material, and then subjecting it to ionizing radiation from any one of a class of radiation sources consisting of X-rays, gamma rays and electrons, said ionizing radiation being of sufficient energy to cause substantially uniform penetration of said crystal.

2. A method of selectively varying the hysteresis characteristic of a single crystal of monoclinic glycine sulphate 0.013 millimeter thick comprising the steps of electrically polarizing the material to saturation, and then subjecting it to ionizing radiation from any one of a class of radiation sources consisting of X-rays, gamma rays and electrons, said radiation having an energy of at least $10^4$ electron volts.

3. A method of selectively varying the hysteresis characteristic of a single crystal of monoclinic glycine sulphate by subjecting it to ionizing radiation from any one of a class of radiation sources consisting of X-rays, gamma rays and electrons, said ionizing radiation being of sufficient energy to cause substantially uniform penetration of said crystal.

4. A method of selectively varying the hysteresis characteristic of a single crystal of monoclinic glycine sulphate which comprises electrically polarizing the material while subjecting it to ionizing radiation from any one of a class of radiation sources consisting of X-rays, gamma rays and electrons, said ionizing radiation being of sufficient energy to cause substantially uniform penetration of said crystal.

5. A method of selectively varying the hysteresis characteristic of a neutrally polarized single crystal of monoclinic glycine sulphate which comprises subjecting the material to ionizing radiation from any one of a class of radiation sources consisting of X-rays, gamma rays and electrons, said ionizing radiation being of sufficient energy to cause substantially uniform penetration of said crystal.

6. A method of selectively varying the hysteresis characteristics of a single crystal of monoclinic glycine sulphate comprising the steps of electrically polarizing the material to saturation and then subjecting said crystal to radiation from any one of a class of ionizing radiation sources consisting of X-rays, gamma rays and electrons, said radiation being of sufficient energy ot cause substantially uniform penetration of said crystal.

References Cited in the file of this patent

UNITED STATES PATENTS

| | | |
|---|---|---|
| 2,537,388 | Wooldridge | Jan. 9, 1951 |
| 2,576,045 | Robinson | Nov. 20, 1951 |
| 2,648,823 | Kock | Aug. 11, 1953 |
| 2,695,396 | Anderson | Nov. 23, 1954 |
| 2,717,373 | Anderson | Sept. 6, 1955 |
| 2,838,723 | Crownover | June 10, 1958 |
| 2,839,738 | Wolfe | June 17, 1958 |